United States Patent
Gorshe et al.

(10) Patent No.: US 10,797,816 B1
(45) Date of Patent: Oct. 6, 2020

(54) METHOD FOR PROVIDING PATH SIGNAL OVERHEAD IN THE 64B/66B CHARACTER STREAM OF AN ITU-T METRO TRANSPORT NETWORK

(71) Applicant: Microchip Technology Inc., Chandler, AZ (US)

(72) Inventors: Steven Scott Gorshe, Beaverton, OR (US); Winston Mok, Vancouver (CA)

(73) Assignee: Microchip Technology Inc., Chandler, AZ (US)

( * ) Notice: Subject to any disclaimer, the term of this patent is extended or adjusted under 35 U.S.C. 154(b) by 0 days.

(21) Appl. No.: 16/446,576

(22) Filed: Jun. 19, 2019

Related U.S. Application Data

(60) Provisional application No. 62/857,749, filed on Jun. 5, 2019.

(51) Int. Cl.
| | |
|---|---|
| *H04B 10/516* | (2013.01) |
| *H04J 3/16* | (2006.01) |
| *H04L 12/26* | (2006.01) |
| *H04Q 11/00* | (2006.01) |
| *H04L 12/721* | (2013.01) |

(52) U.S. Cl.
CPC ........ *H04J 3/1664* (2013.01); *H04L 43/0847* (2013.01); *H04L 45/66* (2013.01); *H04Q 11/0062* (2013.01); *H04Q 2213/13215* (2013.01)

(58) Field of Classification Search
CPC .................................................. H04B 10/516
See application file for complete search history.

(56) References Cited

U.S. PATENT DOCUMENTS

| | | | |
|---|---|---|---|
| 2005/0185958 A1* | 8/2005 | Atsumi ..................... | H04J 3/12 398/49 |
| 2011/0126074 A1* | 5/2011 | Calderon .............. | H04L 1/0057 714/752 |
| 2017/0005901 A1* | 1/2017 | Gareau ................. | H04J 3/1658 |

OTHER PUBLICATIONS

PCT/US2019!044812 , International Search Report and Written Opinion of the International Searching Authority, dated Jan. 9, 2020.
Steve Gorshe, "MTN Path Overhead Proposal—Overhead Frame Structure; WD11-13", ITU-T Draft; Study Period 2017-2020; Study Group 15; Series C1181, International Telecommunication Union, Geneva ; Switzerland, vol. 11/15, Apr. 2, 2019.

(Continued)

*Primary Examiner* — Shi K Li
(74) *Attorney, Agent, or Firm* — Glass and Associates; Kenneth Glass; Kenneth D'Alessandro

(57) ABSTRACT

A method for extracting POH data blocks and a MOS control block from a data stream in a 64B/66B-block communication link including receiving a data stream, finding a first combination of a MOS control block and K POH data blocks including CRC data in the data stream, extracting the MOS control block and the K POH data blocks from the data stream, searching in a window for a subsequent combination of a MOS control block and K POH data blocks and removing them if at least one of them are found, if neither the subsequent MOS control block nor the K POH data blocks are found within the predetermined window, extracting from the data stream K+1 64B/66B-blocks in the predetermined window.

15 Claims, 8 Drawing Sheets

(56) References Cited

OTHER PUBLICATIONS

Steve Gorshe, "MTN Path Overhead Proposal—Overhead Method and Frame Structure;CII81", ITU-T Draft; Study Period 2017-2020; Study Group 15; Series C1181, International Telecommunication Union, Geneva ; Switzerland, vol. 11/15, Jun. 18, 2019.

Yang, Jian, Betts, Malkcolm, Gu, Yuan, "SCL OAM solution", ITU-T WD11-65, International Telecommunication Union, Geneva, Switzerland, Jun. 2018.

ITU-T G.8013/Y.1731, "Operation, administration and maintenance (OAM) functions and mechanisms for Ethernet-based networks", International Telecommunication Union, Geneva, Switzerland, Aug. 2015.

Trowbridge, Steve, "G.mtn Section and Path Overhead Options," ITU-T WD11-10, Nokia USA, International Telecommunication Union, Geneva, Switzerland, Apr. 2019.

\* cited by examiner

| 66 | 1 | 0 | 0x4B | R | Type | Value1 | R | Seq | O Code | 0x000000 |

↑ 62

MTN Ordered Set (MOS) Control Block format

FIG. 4A

| 66 | 0 | 1 | Value1 | Value2 | Value3 | Value4 | Value5 | Value6 | Value7 | Value8 |

↑ 60

POH Data Block format, characters 1 through (K-1)

FIG. 4B

| 66 | 0 | 1 | Value1 | Value2 | Value3 | Value4 | Value5 | Value6 | CRC-16 |

↑ 60

POH Data Block format, character K

FIG. 4C

| Interval N (66-bit blocks) | Minimum Window W (66-bit blocks) | Frame Period μS | K = 2 POH data blocks | | K = 3 POH data blocks | |
|---|---|---|---|---|---|---|
| | | | Additional Transmission Bandwidth | Raw POH bandwidth (kbits/s) | Additional Transmission Bandwidth | Raw POH bandwidth (kbits/s) |
| 16K | 4 | 211 | 183 | 648.5 | 244 | 953.7 |
| 32K | 7 | 422 | 92 | 324 | 122 | 476.8 |
| 64K | 14 | 845 | 46 | 162 | 61 | 238.4 |
| 512K | 105 | 1690 | 6 | | 8 | |

FIG. 9

METHOD FOR PROVIDING PATH SIGNAL OVERHEAD IN THE 64B/66B CHARACTER STREAM OF AN ITU-T METRO TRANSPORT NETWORK

BACKGROUND

The present invention relates to ITU-T transport networks. More particularly, the present invention relates to methods for providing path signal overhead in the 64b/66b character stream of an ITU-T metro transport network.

The ITU-T Metro Transport Network (MTN) scope requires that "The path layer provides flexible connections that carry client data and path OAM in 64B/66B blocks that are conformant to IEEE 802.3 clause 82 encoding rules and results in valid 802.3 64B/66B blocks, which allows using the lower layers of the Ethernet protocol stack." "Path OAM (Operations, Administrations, and Maintenance) Overhead" is abbreviated to Path Overhead (POH) here. Sending the POH in separate Ethernet frames requires too much bandwidth and is inefficient to process. A previous proposal was to provide the POH by carrying it inside Ethernet Ordered set blocks, inserted into the stream on a quasi-regular basis. Ordered set blocks can be inserted by effectively replacing an inter-packet Idle block.

There are three key drawbacks to this approach. First, the Ordered set blocks of that proposal were not valid 802.3 64B/66B blocks and hence can't be used for MTN. Clause 82-compliant Ordered Sets only have available space for three bytes. However, each Ordered Set must contain some housekeeping information, i.e., some indication of the type of message it carries and its sequence number within a larger message. Based on some previous proposals, this would require two bytes of housekeeping information in the MTN Ordered Set (MOS), leaving only one byte available to carry actual POH data. Thus, the number of POH information bearing bytes per MOS is three minus the number of housekeeping information bytes, resulting in a need for a large number of MOS per second to achieve meaningful overhead bandwidth. Second, there are a limited number of Idle blocks in an Ethernet stream that are available to be replaced by an Ordered set block. Consequently, for the same Ordered set insertion rate, there is a significant increase in the latency of message transmission, depending on the number of Ordered set bytes available to carry actual POH information. Third, inserting the Ordered set blocks by replacing inter-packet Idle blocks prevents a regular period between the overhead blocks. Because of these drawbacks, a different approach is required.

The previous solution of sending the Path overhead (POH) in separate full Ethernet frames presents issues, since a minimum length Ethernet frame is 48 bytes, and as a result this approach requires too much bandwidth and can impact the client data stream. An earlier proposal to the ITU-T Q11/15 standard group was to provide POH by carrying it inside Ethernet Ordered set blocks, inserted into the stream on a quasi-regular basis. As explained above this approach has very significant drawbacks. There are currently no devices that implement the MTN protocol, since the standards for it are currently under development in ITU-T Q11/15.

BRIEF DESCRIPTION

The MTN Path layer is effectively a sub-layer "shim" that sits within an IEEE 802.3 Physical Coding Sublayer (PCS). At the transmitter, it receives an IEEE 802.3 clause 82-compliant 64B/66B-encoded Ethernet client data stream, adds POH and outputs the stream to a section layer that the reuses elements of the Optical Internetworking Forum (OIF) "FlexE" shim. The receiver MTN shim reverses the process. The present invention includes components in both the transmitter and receiver.

According to an aspect of the invention, a combination of a valid MTN ordered set control block and POH data blocks are inserted on a periodic basis for carrying the path signal overhead. The location and format of the POH data blocks provide a recognizable pattern. The POH data blocks also provide some protection for the ordered set block.

According to an aspect of the invention, the invention provides a method for recognizing the POH locations in the presence of errors, and for recovering from error conditions. The recognizable characteristic of the POH data blocks allows for detecting the POH location and recovering most of the POH information even if the MTN ordered set control block is corrupted by transmission errors.

According to an aspect of the invention, placement of the POH data blocks ahead of the MTN ordered set control block prevents insertion of Idles within the combination of POH data blocks and MTN ordered set control block.

According to an aspect of the invention, in certain embodiments the physical layer stream rate is preferably increased enough to accommodate the bandwidth needed for the combination of POH data blocks and MTN ordered set control block. The rate increase is a function of the number of POH data blocks inserted per frame, and the spacing between insertions (i.e., the MTN frame length).

According to an aspect of the invention, in certain embodiments Ethernet Idle blocks are removed between the PCS and MTN POH sub-layers in order to provide the bandwidth needed for the combination of POH data blocks and MTN ordered set control block.

According to an aspect of the invention, a method for extracting path overhead (POH) data blocks and a Metro Transport Network ordered set (MOS) control block from a data stream in a 64B/66B-block communication link includes, 1) receiving at a sink node a data stream in a 64B/66B-block communication link, 2) finding within the data stream a first combination of an initial MOS control block and initial K valid POH data blocks including CRC data, 3) extracting the initial MOS control block and the K initial valid POH data blocks including the CRC data from the data stream, 4) searching within a predetermined window in the data stream for a subsequent MOS control block, and 5) if the subsequent MOS control block is found within the predetermined window, removing the found subsequent MOS control block and K POH data blocks associated with the subsequent MOS control block from the data stream and returning to 4).

According to an aspect of the invention, the method further includes: if the subsequent MOS control block is not found within the predetermined window, converting K+1 64B/66B blocks associated with at least one candidate MOS control block to Ethernet error blocks, extracting from the data stream K+1 64B/66B blocks associated with a candidate MOS control block such that at least one Ethernet error block remains in the data stream and returning to 2).

According to an aspect of the invention, converting K+1 64B/66B blocks associated with at least one candidate subsequent MOS control block to Ethernet error blocks comprises converting K+1 64B/66B blocks associated with only one candidate subsequent MOS control block to Ethernet error blocks, and extracting from the data stream K+1 64B/66B blocks associated with a candidate subsequent MOS control block comprises extracting K+1 64B/66B blocks associated with a candidate subsequent MOS control block other than the ones that were converted to Ethernet error blocks.

According to an aspect of the invention, after converting K+1 64B/66B blocks associated with at least one candidate subsequent MOS control block to Ethernet error blocks, setting an error flag before returning to 2).

According to an aspect of the invention, searching within a predetermined window in the data stream for a subsequent MOS control block comprises searching for the subsequent MOS control block within the window and K valid POH data blocks associated with the subsequent MOS control block, and if the subsequent MOS control block and subsequent K valid POH data blocks are found, removing the found subsequent MOS control block and the K valid POH data blocks from the data stream and returning to 4), if the subsequent MOS control block is found, but the subsequent K valid POH data blocks associated with the subsequent MOS control block are not found, removing the subsequent MOS control block and removing 64B/66B-blocks in expected positions of the subsequent K POH data blocks from the data stream and returning to 4), if the subsequent MOS control block is not found within the predetermined window and the subsequent K valid POH data blocks are found, removing the subsequent K valid POH data blocks from the data stream and a 64B/66B block from the expected location of the subsequent MOS control block and returning to 4), and if neither the subsequent MOS control block nor subsequent K POH data blocks are found within the predetermined window, converting K+1 64B/66B blocks associated with at least one candidate subsequent MOS control block to Ethernet error blocks, extracting from the data stream K+1 64B/66B blocks associated with a candidate subsequent MOS control block such that at least one Ethernet error block remains in the data stream and returning to 4).

According to an aspect of the invention, converting K+1 64B/66B blocks associated with at least one candidate subsequent MOS control block to Ethernet error blocks comprises converting K+1 64B/66B blocks associated with only one candidate subsequent MOS control block to Ethernet error blocks, and extracting from the data stream K+1 64B/66B blocks associated with a candidate subsequent MOS control block comprises extracting K+1 64B/66B blocks associated with a candidate subsequent MOS control block other than the ones that were converted to Ethernet error blocks.

According to an aspect of the invention, the method further includes: after converting K+1 64B/66B blocks associated with at least one candidate subsequent MOS control block to Ethernet error blocks, setting an error flag before returning to 4).

According to an aspect of the invention, a source node for providing path signal overhead in a 64b/66b character stream of an ITU-T metro transport network includes a circuit for receiving a 64B/66b character stream and periodically inserting a MTN ordered set (MOS) control block and K POH data blocks into the 64B/66b character stream to form a transmit path signal frame, a circuit for inserting/removing 64B/66B idle blocks to adapt the rate of the character stream to a FlexE calendar slot rate, a circuit for mapping the character stream FlexE calendar slots, and a circuit for inserting section layer overhead (SOH) into the character stream.

According to an aspect of the invention, a sink node for extracting path signal overhead in a 64b/66b character stream of an ITU-T metro transport network includes a circuit for removing section layer overhead (SOH) from the character stream, a circuit for extracting the character stream from received calendar slots, a circuit for rate adapting the character stream by inserting/removing idle blocks from the character stream in accordance with ITU-T metro transport network protocol, and a circuit for extracting MTN ordered set (MOS) control blocks and POH data blocks from the 64B/66b character stream.

According to an aspect of the invention, the circuit for extracting MTN ordered set (MOS) control blocks and POH data blocks from the 64B/66b character stream is configured to search the character stream to find sets of 64B/66b blocks each including a MOS control block and at least one POH data block, and removing found sets of 64B/66b blocks including a MOS control block and at least one POH data block from the character stream.

According to an aspect of the invention, the circuit for extracting MTN ordered set (MOS) control blocks and POH data blocks from the 64B/66b character stream is further configured to extract the MOS control block and a number of 64B/66b blocks equal to the at least one POH data block from expected locations in the 64B/66b character stream when the MOS control block is found and the at least one POH data block cannot be found, extract the at least one POH data block and a 64B/66B data block from an expected MOS control block location in the 64B/66b character stream when the at least one POH data block is found and the MOS control block cannot be found, and extract a number of 64B/66b blocks equal to the total number of blocks in a set of MTN ordered set (MOS) control blocks and POH data blocks from expected locations in the 64B/66b character stream when the set of MTN ordered set (MOS) control blocks and POH data blocks cannot be found.

BRIEF DESCRIPTION OF THE DRAWING FIGURES

The invention will be explained in more detail in the following with reference to embodiments and to the drawing in which are shown:

FIG. 4A is a diagram showing a representative MOS control block format disposed within a frame;

FIG. 4B is a diagram showing a representative POH data block format disposed within a frame for characters 1 through (K−1);

FIG. 4C is a diagram showing a representative POH data block format disposed within a frame for character K;

Figure 6:
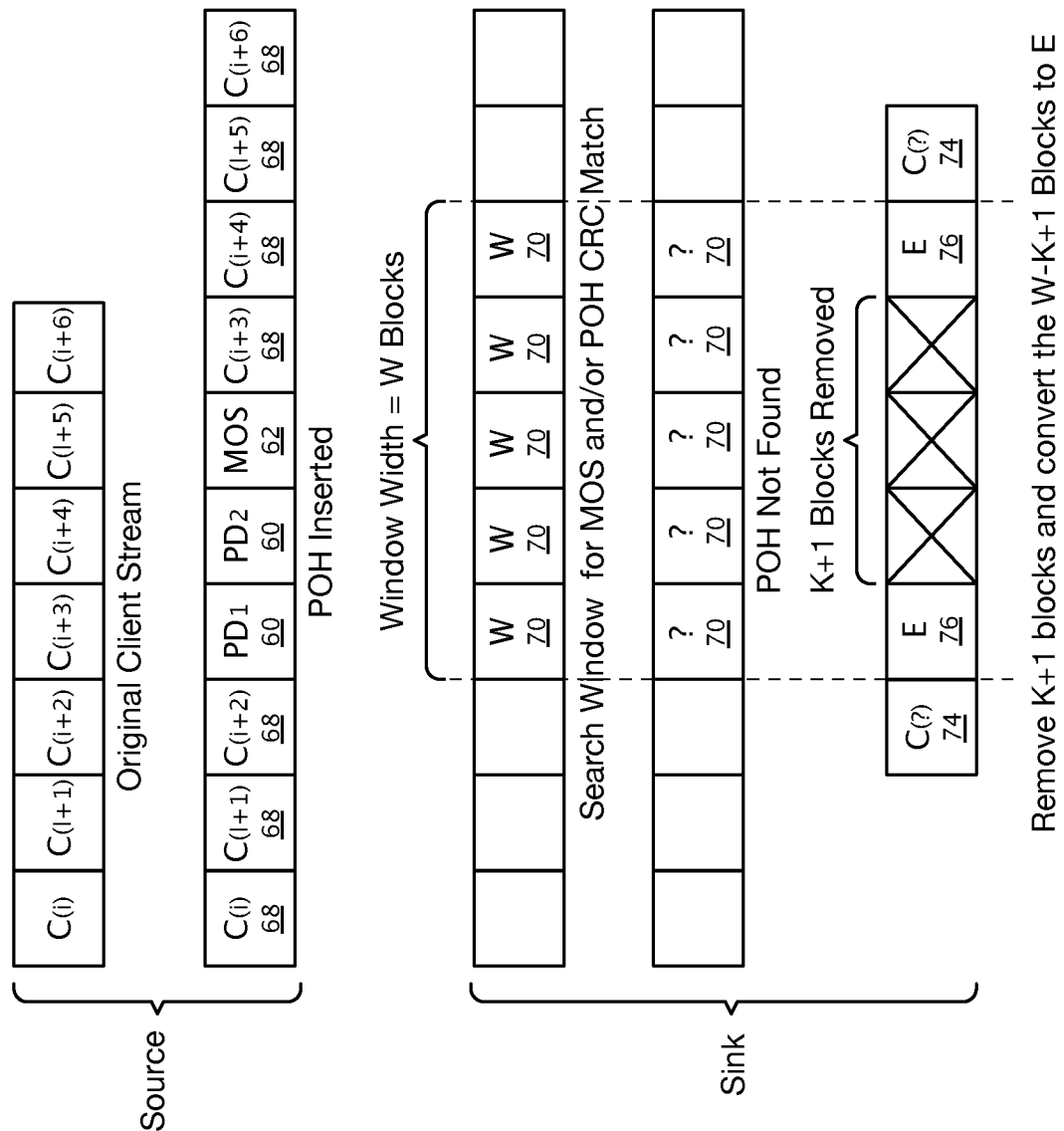
Figure 7:
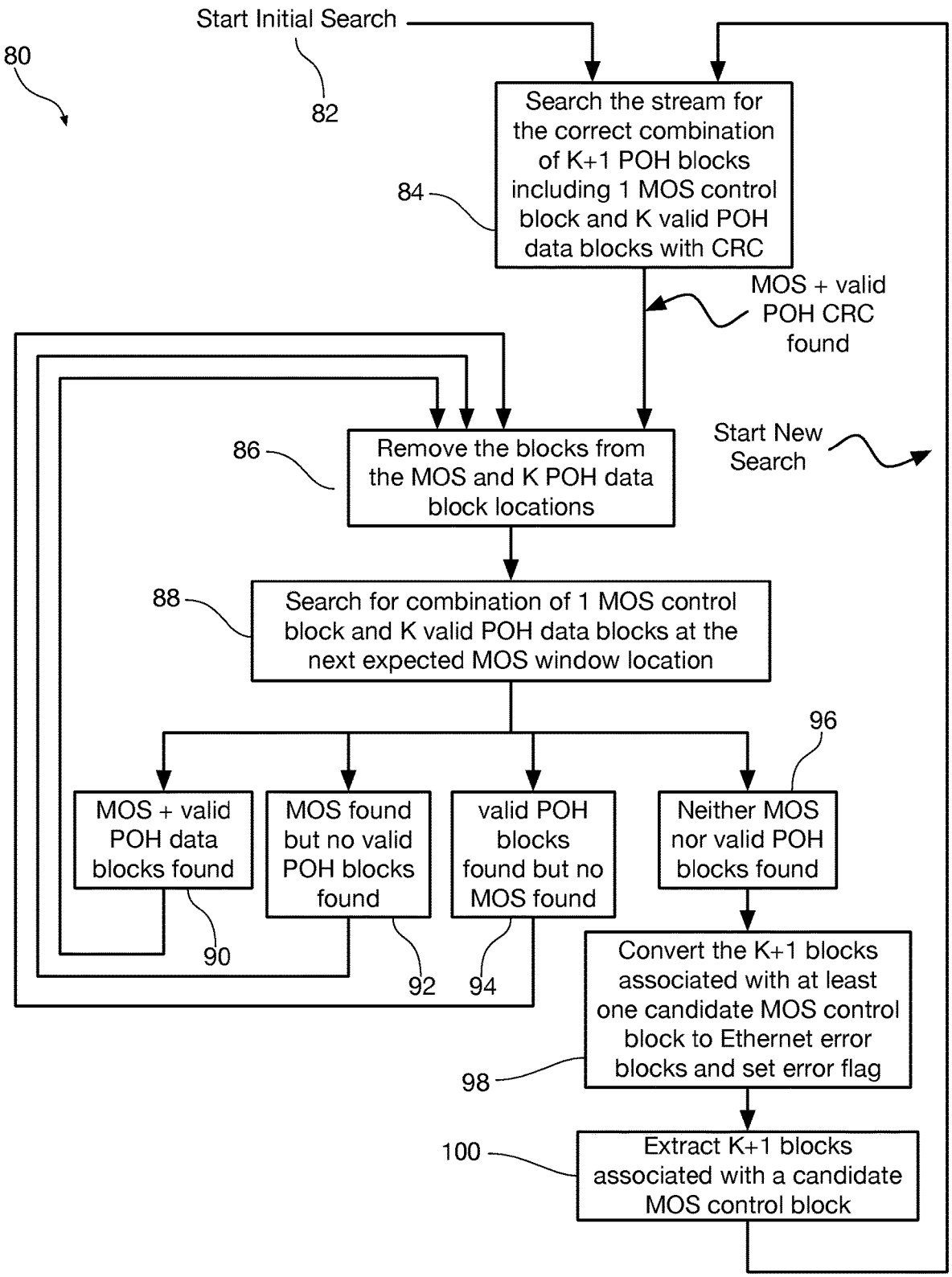
Figure 8:
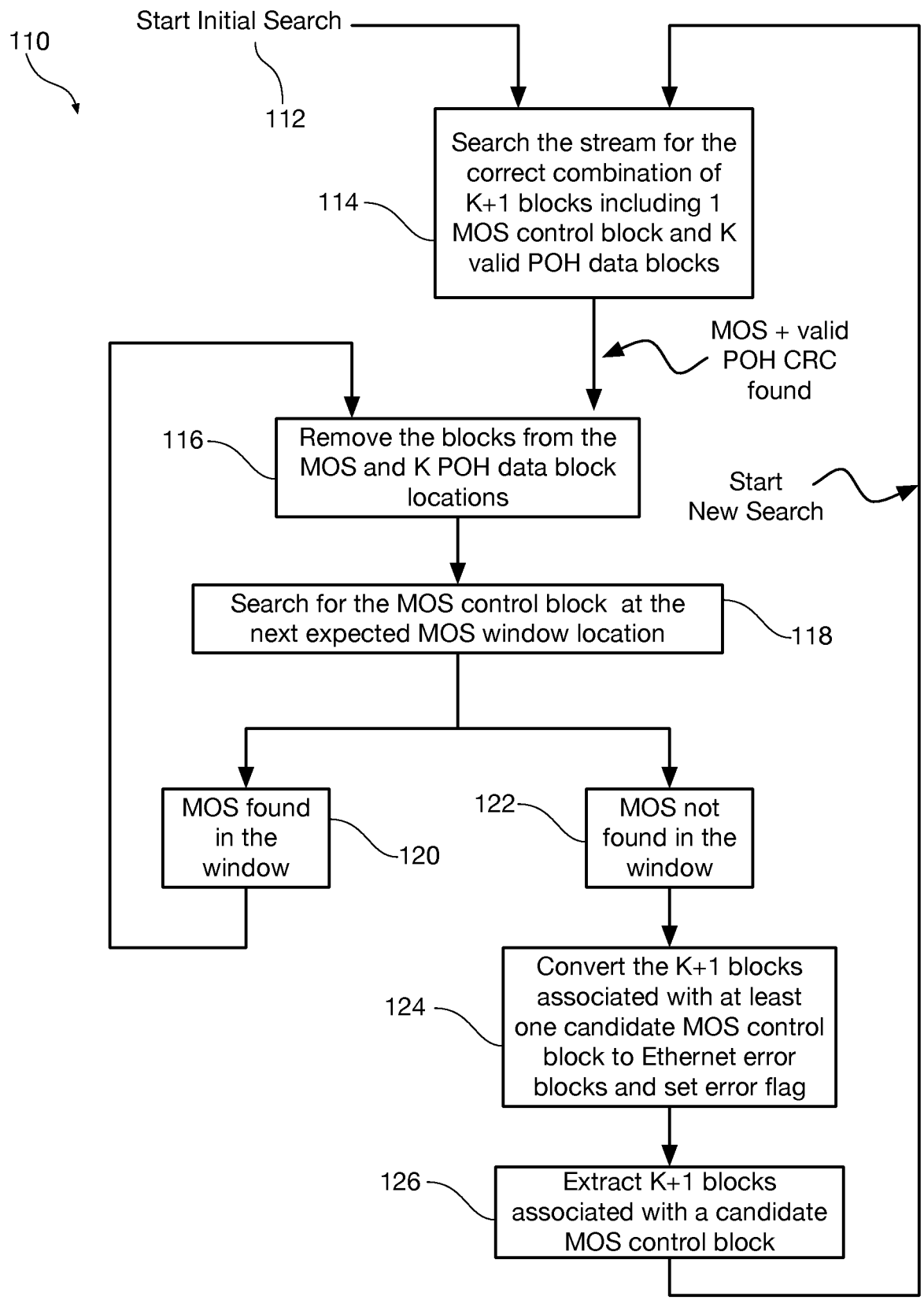

FIG. 6 is a diagram showing an original client data stream and the same data stream with POH and MOS control inserted for transmit, the search window region, and illustrating the result where the POH data blocks and a MOS control block control have not been located FIG. 7 is a diagram showing a state machine for performing the search of and extraction from a data stream for POH data blocks and a MOS control block;

FIG. 8 is a diagram showing a state machine for performing a simplified search of and extraction from a data stream for POH data blocks and a MOS control block; and FIG. 9 is a table showing examples of tradeoffs for POH bandwidth, latency, and PHY rate increase.

DETAILED DESCRIPTION

Persons of ordinary skill in the art will realize that the following description is illustrative only and not in any way limiting. Other embodiments will readily suggest themselves to such skilled persons.

The MTN path layer is essentially a shim within an IEEE 802.3 PCS. Its upper layer interfaces to a clause 82-compliant 64B/66B-encoded Ethernet client data stream, and its lower layer interfaces to an MTN Section layer that the reuses elements of the OIF "FlexE" shim Consequently, the MTN Path shim is free to add any POH blocks subject to three constraints. First, the POH blocks must be transparent to the FlexE-type Section layer so that they are guaranteed to reach the receiver MTN Path shim Second, the POH information in the stream from the transmit MTN Path shim must be reliably recognizable by the receiver MTN Path shim such that the receiver MTN Path shim can extract and remove the POH before passing the restored 64B/66B block stream toward the Ethernet MAC layer. Third, any associated required increase to the PHY signal rate must be reasonable to accommodate without requiring a new PHY design (e.g., within 200 ppm of the nominal Ethernet rate).

Figure 1:
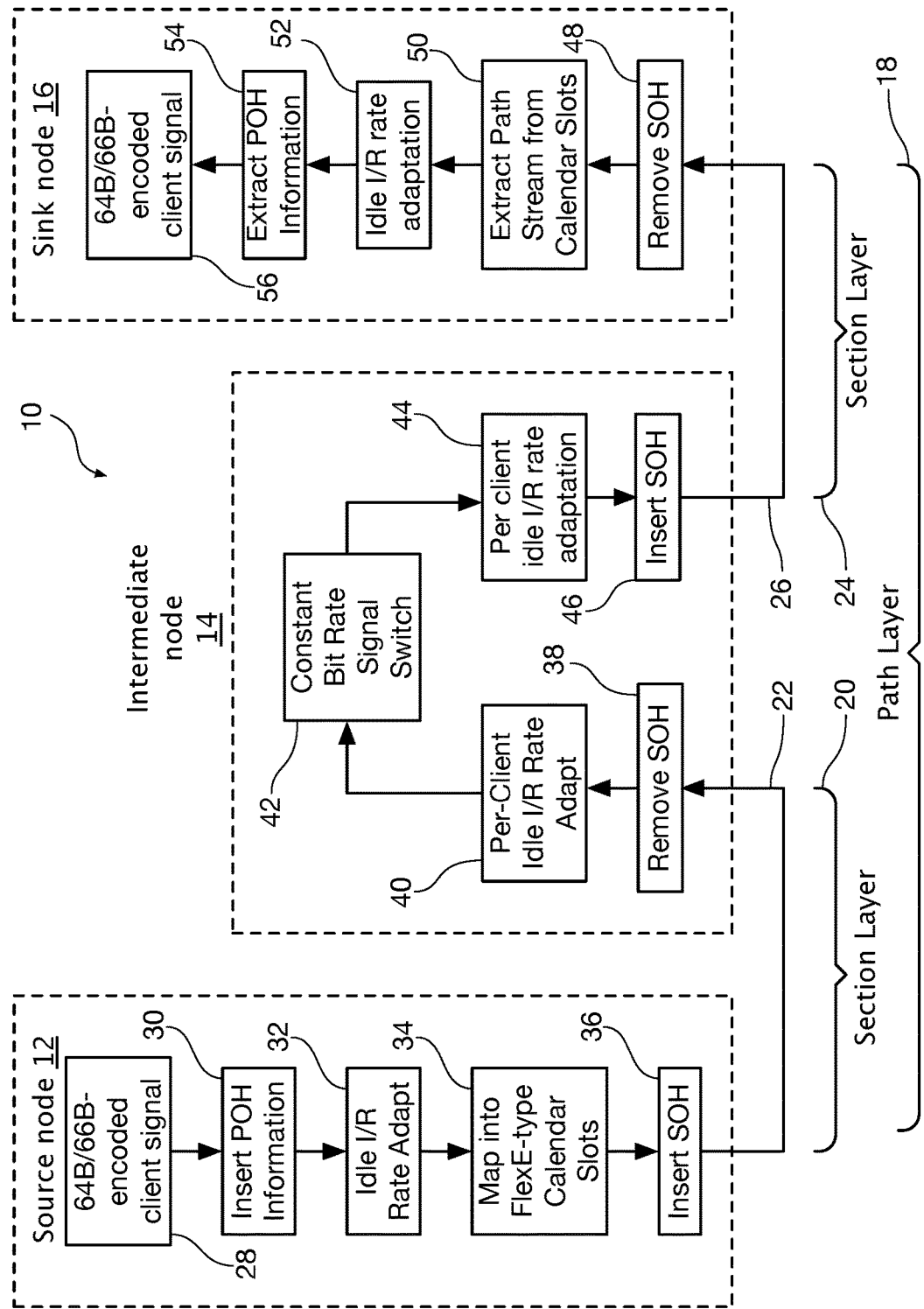
FIG. 1 is a block diagram showing a basic network illustration for providing path signal overhead in the 64b/66b character stream of an ITU-T metro transport network.

Referring now to FIG. 1, a block diagram shows how the present invention is situated in an ITU-T metro transport network 10. The metro transport network 10 is shown having a representative source node 12, an intermediate node 14 and a sink node 16. Data blocks originating in the source node 12 pass through the intermediate node 14 to the sink node 16 over a path layer indicated at reference numeral 18.

The data blocks pass between the source node 12 and the intermediate node 14 over a section layer 20 through a connection 22 and pass between the intermediate layer 14 to the sink layer 16 over a section layer 24 through a connection 26. The timing and operation of the ITU-T metro transport network 10 depicted in FIG. 1 is known except for the differences noted herein that implement the present invention.

A 64B/66B encoded client signal shown at reference numeral 28 has POH information inserted at reference numeral 30. As will be discussed with reference to FIGS. 1B, 2A, 2B, 3A, 3B, and 4A through 4C, POH information is inserted in accordance with an aspect of the present invention.

At reference numeral 32 idle blocks are inserted into, or removed from, the data stream that includes the 64B/66B encoded client signal and the inserted POH information to adapt the rate of the data stream to the rate of the FlexE calendar slots as is known in the art. At reference numeral 34 the 64B/66B encoded client signal blocks are mapped into FlexE calendar slots as is known in the art. At reference numeral 36, section layer overhead (SOH) is inserted into the data stream to monitor the performance of section layer 20 as is known in the art. The resulting data stream is then transmitted across the section layer to the intermediate node 14 via connection 22.

When the data stream arrives at the intermediate node 14 the SOH inserted at reference numeral 36 is removed from the data stream at reference numeral 38. At reference numeral 40 idle blocks are inserted, or removed, to match the data rate to the calendar slot of switch 42 to which the rate adapted data is then sent. The data that is intended to be sent to the sink node 16 is then provided to reference numeral 44 where idle blocks are inserted or removed to match the data rate to the Calendar Slots of the section layer 24. Those skilled in the art will recognize that if data rate of switch 42 is locked to the data rate of section layer 24, reference numeral 44 is not required. At reference numeral 46 SOH is inserted into the data stream to monitor the performance of the section layer 26. The resulting data stream is then transmitted to the sink node 16 at the data rate of the section layer 26 over the connection 24.

The operation of the intermediate node 14 is independent of the present invention in that the operation of the intermediate node 14 is unaffected by the content of the data stream. The fact that implementation of the present invention in the operation of the ITU-T metro transport network 10 is completely transparent is in itself, an aspect of the present invention which operates within the protocol of the ITU-T metro transport network 10.

At the sink node 16 the SOH is removed from the data stream at reference numeral 48. At reference numeral 50 the path stream is extracted from the calendar slots and at reference numeral 52 idle blocks are inserted, or removed. The operation of the sink node at reference numerals 48, 50, and 52 is in accordance with the protocol of the ITU-T metro transport network 10 and is thus well known in the prior art. The operations performed at reference numerals 48, 50, and 52 is completely independent of the content of the data stream.

Figure 5A:
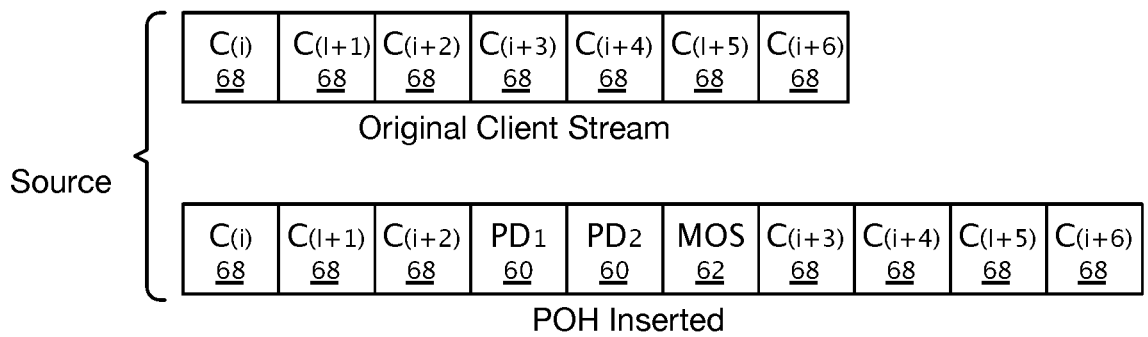
FIG. 5A is a diagram showing an original client data stream and the same data stream with POH data blocks and a MOS control block inserted for transmit.
Figure 5B:
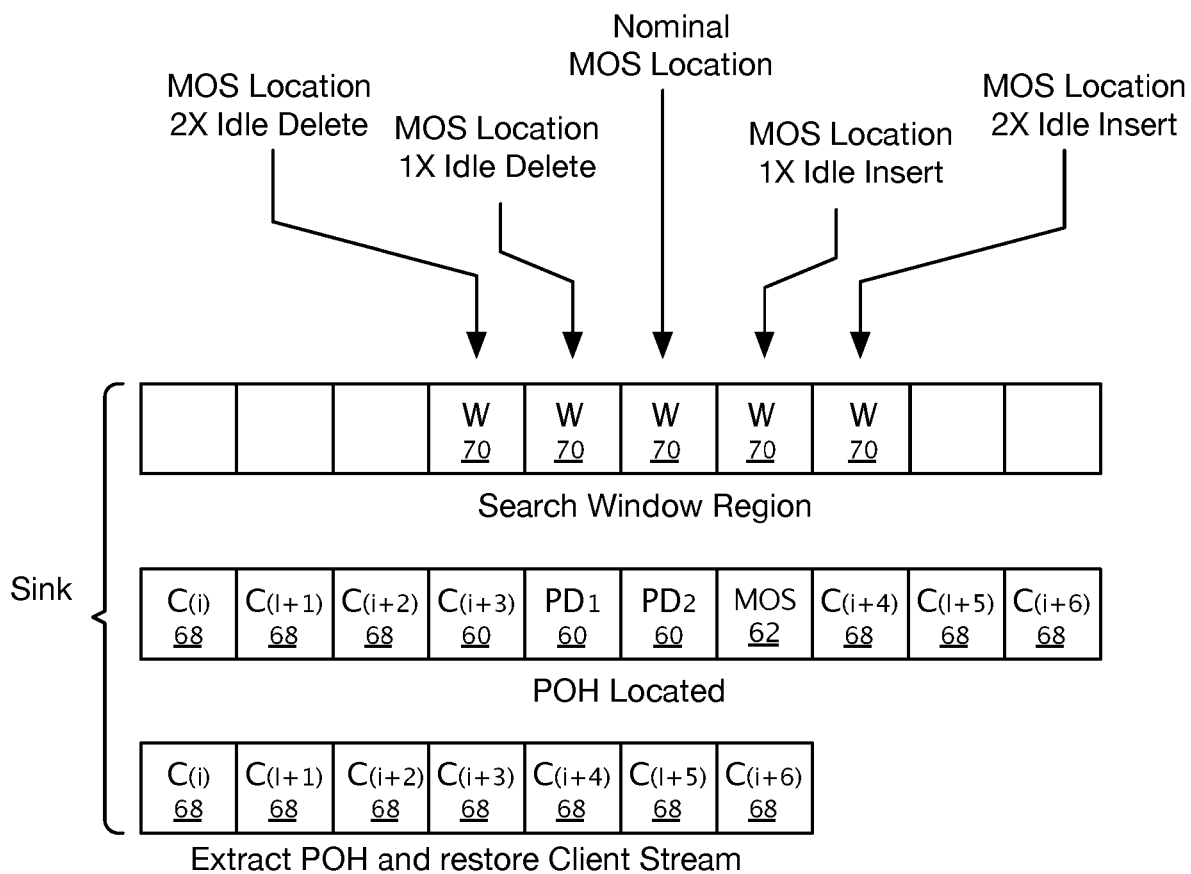
FIG. 5B is a diagram showing a search window region, a received data stream with POH and MOS control having been located, and the restored client data stream after extraction.

At reference numeral 54, the POH information is extracted from the data stream to recover the 64B/66B client signal at reference numeral 56. It is at this stage of the operation of the sink node 16 that the error correction depicted in FIGS. 5A and 5B is performed in accordance with an aspect of the present invention.

Figures 2A, 2B, 3A, 3B:
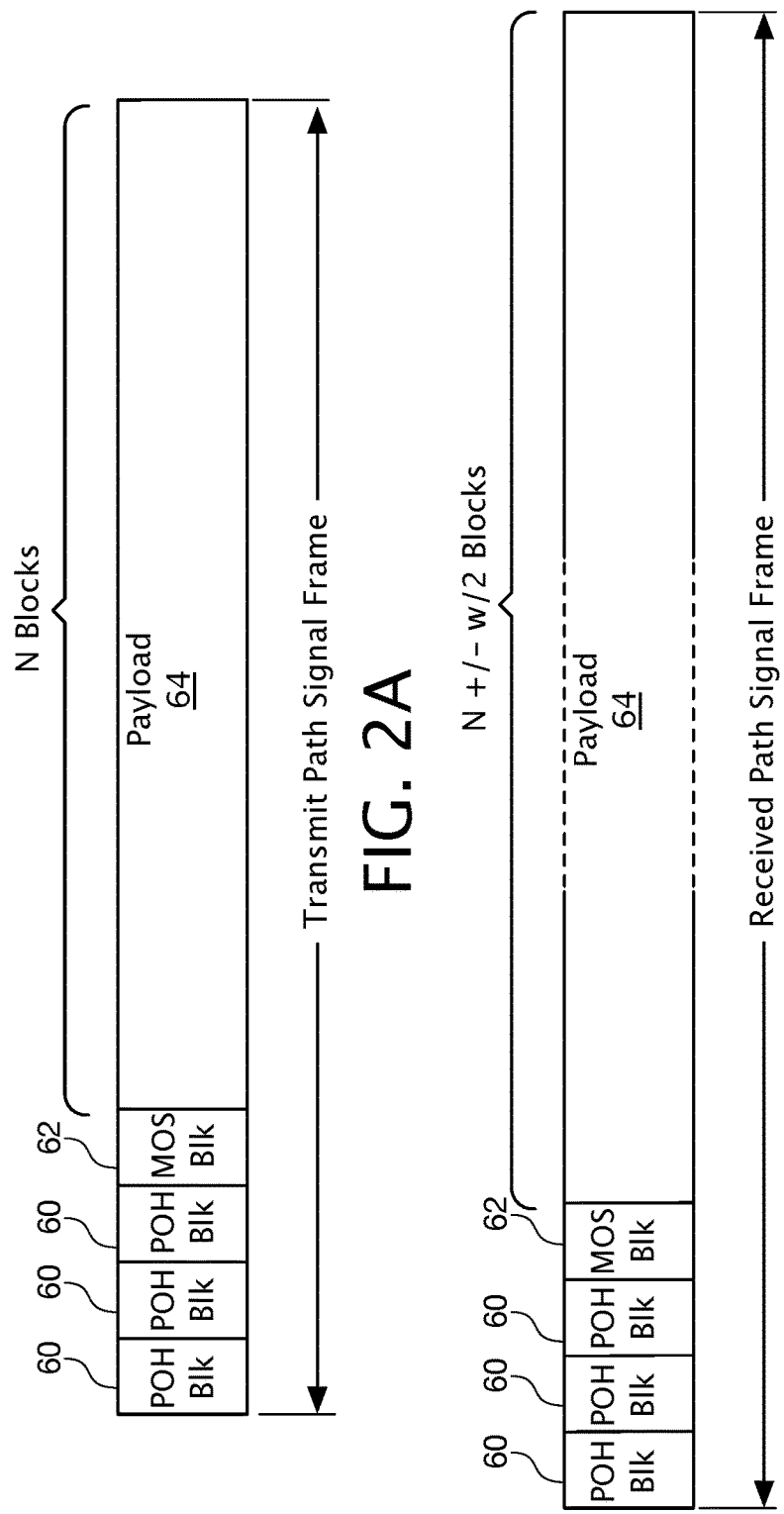
FIG. 2A is a diagram showing a representative path signal frame having POH data blocks and a MOS control block disposed within the frame for transmit.
FIG. 2B is a diagram showing the representative path signal frame of FIG. 2A having POH data blocks and a MOS control block disposed within the frame after it has been received.
FIG. 3A is a diagram showing a first way of ordering the POH data blocks and MOS control block within the frame.
FIG. 3B is a diagram showing a second way of ordering the POH data blocks and MOS control block within the frame.

The source node 12 inserts POH information on a regular/periodic basis. Specifically, the transmitted MTN frame consists of the POH information blocks followed by "N" client 64B/66B blocks. Referring now to FIG. 2A and FIG. 2B, diagrams show, respectively, a representative path signal frame having POH data blocks 60 and MOS control block 62 preceding N payload data blocks 64 disposed within the frame for transmit, and the representative path signal frame of FIG. 2B having the POH data blocks 60 and the MOS control block 62 along with the payload blocks 64 disposed within the frame after it has been received. As received the path signal frame includes N±W/2 payload blocks 64 as a result of the addition or subtraction of up to W/2 Idle blocks at one or more of reference numerals 32, 40, 44 or 52. The quantity W represents a consecutive set of block locations where it is expected that an MOS control block 62 and POH data blocks 60 will be received.

As seen in FIGS. 2A and 2B, the POH information consists of one or more POH data blocks 60 and MTN Ordered set (MOS) block 62. FIGS. 3A and 3B illustrate alternative ways of ordering the POH data blocks 60 and the MOS control block 62. FIG. 3A is a diagram that shows a first way of ordering the POH and MOS control blocks 60 and 62 in which K POH data blocks 60 are grouped together preceding a MOS control block 62 within the frame. FIG. 3B is a diagram that shows a second way of ordering the POH data blocks 60 and MOS control block 62 within the frame in which (K−1) POH data blocks 60 are grouped together preceding a MOS control block 62 within the frame, followed by the Kth POH data block 60.

According to one embodiment of the present invention, the POH data blocks 60 are placed immediately preceding the MOS control block 62, as illustrated in FIGS. 2A, 2B, and 3A. The IEEE 802.3 rules for Idle insertion allow inserting an Idle after an Idle or an Ordered Set. Idles are not allowed after a data block. Hence, the POH data blocks 60 preceding the MOS control block 62 prevent an Idle from being inserted between the POH data blocks 62 and the MOS control block 62. The 802.3 Idle removal rules also allow for removing a Sequence Ordered set block, when there are two present consecutively. Hence, there is no risk of an MOS control block 62 being removed by the Idle removal process because it is not a Sequence Ordered set.

One consequence of making the MOS control block 62 the last block in the set is that the FlexE-like shim (see FIG. 8) would regard the location immediately following the MOS control block 62 as being eligible for Idle block insertion. Unless the POH blocks 60 are located in an inter-packet gap, this Idle block would be located within a packet, thus corrupting the packet if it were passed to the MAC layer at the receiver after removing the POH blocks 60. Consequently, according to aspects of the invention, unless the POH blocks 60 are located in an inter-packet gap, any Idle blocks that immediately follow the MOS control block 62 are removed by the MTN Path shim. For the purposes of the invention, the POH data blocks 60 can be determined to not be located in an inter-packet gap region if the block that immediately precedes the POH data blocks 60 is either a data block or a Type 0x78 control block, which contains the /S/ Start of Frame indicator. (See IEEE 802.3 FIG. 82-5.)

Alternatively, as shown in FIG. 3B, the final POH data block 60 can be placed immediately following the MOS control block 62. This alternative avoids having to decide if Idles following the MOS control block 62 need to be removed, since all Idles immediately following the MOS control block 62 are always removed. However, the embodiment depicted in FIG. 3A is presently preferred since the relative complexity of having to skip over intervening MOS control blocks 62 or Idle blocks while searching for the POH data block CRC needed to validate the POH data blocks 60 is greater than performing a check of the block immediately preceding the POH blocks 60.

Referring now to FIG. 4A, FIG. 4B, and FIG. 4C, the arrangements of the MOS control block 62 and the K POH data blocks 60 is shown. These blocks are all 64B/66B blocks.

In FIG. 4A, the MOS control block 62 begins with "10" shown in the first bit positions in the block at reference numeral 66 to distinguish a control block from a data block which would begin with "01" in the first bit positions as shown for the POH data blocks 60 in FIGS. 4B and 4C. The next field 0x4B identifies the type of control block (0x designating the number format as hexadecimal) and 4B designating the type of control block as an ordered set. The first "R" field is a 2-bit field that is reserved for potential future definition. Presently undefined fields are typically set to all zeros by convention. The field "Type" indicates the type of message that is being transmitted within the set of POH data blocks 60 that accompany the MOS control block 62. The "Value 1" field is provided for user-defined POH information. The second "R" field is a 4-bit field that is also reserved for potential future definition and is typically set to zero by convention. "Seq" is a sequence number and is used to indicate the portion of the message that is being sent in the current set of POH data blocks 60 if the message must span multiple sets of these blocks. "O-code" indicates the type of Ordered set block, which in this case is a value that indicates a MOS control block 62. The final "0x000000" is a defined field for the MOS ordered set block and its values are all zeros.

It is presently contemplated that a CRC may be included in the MOS control block 62 for error detection within the MOS control block 62.

Referring now to FIGS. 4B and 4C, the format for the characters 1 through (K−1) and character K, respectively, are illustrated. As previously noted, each POH data block 60 begins with "01" shown in the first bit positions in the block at reference numeral 66 to distinguish a data block from a control block. The "Value" fields are simply bytes that carry user-defined POH information. The particular information each carries is outside the scope of the invention. "CRC-16" in the POH data block 60 of FIG. 4C is a 16-bit Cyclic Redundancy Check error detection code covering all of the bits in the K POH data blocks 60.

The addition of the POH data blocks 60 to the MOS control block 62 provides a much more bandwidth-efficient method of communicating the POH information. According to one embodiment shown in FIGS. 4A, 4B, and 4C, the set of "K" POH data blocks 60 can carry 8*K−2 bytes of POH data rather than only the K bytes that could be carried by K MOS control blocks. N and K are constants chosen by design. Specifically, the number of POH data blocks 60 "K" is chosen based on tradeoffs between the required POH bandwidth, the required POH report latency, and the amount of associated required bandwidth increase to the PHY signal. FIG. 9 shows an example of tradeoffs in choosing N and K. The K POH data blocks 60 are constructed to have a characteristic that makes them recognizable by the receiver.

Specifically, as illustrated in FIG. 4C, the last POH data block 60 ends with a CRC (e.g., CRC-16, i.e. a 16-bit cyclical redundancy check) covering the information in the set of K POH data blocks 60. Since the MOS control block 62 is a unique Ordered set type, both the MOS control block 62 and POH data block 60 set are thus independently recognizable at the receiver, allowing it to find the POH information location even when a transmission error corrupts the MOS control block 62, or one or more of the POH data blocks 60. In particular, and as will be explained further below, sink node 16 may recognize the POH information location in the presence of a corrupted MOS control block 62 by finding K POH data blocks 60 with a correct CRC signature. The use of the CRC signature protects the validity of POH information.

The regular period between POH block insertion at the source provides multiple benefits. One benefit is a deterministic POH bandwidth and tightly-bounded latency. Other benefits of a regular period include reduced complexity for the source node, and the potential to send timing or delay measurement information in the overhead, since the sink node 16 knows the period used by the source.

Yet another benefit of a regular period between POH block insertion at the source node 12 is that it allows detecting and expedited recovery from an error condition that corrupts both the MOS control block 62 and the POH data block 60 set. The second benefit is illustrated in the MTN frame recovery scheme shown in FIGS. 7 and 8.

FIG. 5A is a diagram that shows an original client data stream and the same data stream with POH data blocks 60 and MOS control block 62 inserted for transmit and FIG. 5B is a diagram that shows a search window region, a received data stream with POH data blocks 60 and MOS control block 62 having been located, and the restored client data stream after extraction. Client stream data $C_{(i)}$ through $C_{(i+6)}$ is collectively indicated at reference numeral 68 and POH data blocks 60, denoted PD1 and PD2, are collectively indicated at reference numeral 60. An MOS control block is indicated at reference numeral 62.

The receiver expects the next POH block 60 to arrive N blocks after the last POH block 60, subject to variation caused by Ethernet Idle insertion/removal at intermediate points along the path. Since the maximum frequency offset between the Transmitter and Receiver nodes that is allowed in the IEEE 802.3 Standard is 200 ppm, the sink clock could differ from the source clock by 100 ppm in either direction. Hence, the number of blocks in the minimum window of variability "W" (collectively indicated at reference numeral 70 in FIG. 5B) in which the next POH block 60 will arrive is determined by:

$$W \cong [(N \text{ blocks}) \times (2) \times (200/10^6)]$$

The number of POH data blocks 60 is K. In the particular example of FIG. 5B K=2 with W=5, and shows that the POH data blocks 60 and MOS control block 62 have been shifted by the insertion of a single Idle since the last POH appearance. Valid POH information within the POH data blocks 60 and MOS control block 62 can then be identified and processed since the window width W=5 allows for the insertion of the single Idle block. In general at a minimum W should be chosen to be larger than K+1 to accommodate at least one inserted idle block.

If no transmission errors affected the POH data blocks 60, the receiver will identify both the POH data blocks 60 and MOS control block 62 by their unique characteristics as seen in FIGS. 4A, 4B, and 4C, and their locations relative to one another.

For purposes of illustration, two types of framing algorithms are shown; a robust one shown in FIG. 7 and a simpler one shown in FIG. 8.

Both types of framing algorithms declare that the received path signal frame (FIG. 2B) has been found only when an MOS control block 62 has been identified together with K valid POH data blocks. POH data blocks are considered to be valid if they have the correct CRC in the last data POH data block 60. A search is performed for subsequent groups of an MOS control block 62 and POH data blocks 60. If the POH data block locations are found, these K+1 blocks are removed from the stream before it is forwarded toward the Ethernet MAC so that the stream is restored to its original format. FIG. 5B, which uses K=2 with W=5, and shows the POH data blocks 60 shifted by the insertion of a single Idle since the last POH appearance. Valid POH information within the POH data blocks 60 can then be identified and processed. If the POH data block 60 locations cannot be identified within the window, the framer will remove K+1 blocks within the window to restore the proper stream rate toward the Ethernet MAC as shown in FIG. 6. This situation indicates the presence of a significant transmission channel burst error, which is augmented by additional errors if the incorrect K+1 blocks are removed. Since the resulting magnitude of error burst is somewhat more difficult for the Ethernet packet Frame Check Sequence (FCS) to detect, preferably additional adjacent blocks are overwritten by Ethernet /E/ error blocks to ensure that the affected packet(s) will be discarded.

The robust framer, illustrated in FIG. 7, makes use of being able to identify both the MOS control block 62 and the POH data block 60 set. The POH blocks 60 are identified by finding either a MOS control block 62 or a contiguous set of valid K data blocks within the window that is assumed for purposes of the present invention to be a contiguous set of K POH data blocks having the proper CRC. This allows robust detection of the POH block 60 locations if a transmission error has corrupted either the MOS control block 62 or one of the POH data blocks 60, and hence avoids creating the error condition associated with removing the wrong set of K+1 blocks from the stream. If either the MOS control block 62 or correct POH data block 60 CRC is not found, at least some of the POH information is corrupt, and may not be processed.

At reference numeral 82 an initial search is started. At reference numeral 84 the data stream is searched for the correct initial combination of MOS control block 62 and POH blocks 60. A combination of K+1 blocks including one MOS control block 62 and K POH blocks 62 should be found. The MOS control block 62 is identified by the "10" field 66 at the start of the block followed by the 0x4B identifier as shown in FIG. 4A. The POH blocks are validated by the CRC field in the Kth POH block. When the location of the K+1 blocks including one MOS control block 62 and K POH data blocks 60 is determined, at reference numeral 86 the K+1 POH blocks 60 are removed.

At reference numeral 88 the data stream is searched at the next POH window location for a subsequent correct combination of K+1 blocks including one MOS control block 62 and K valid POH data blocks 60. POH data blocks that are found are valid if they have the valid CRC signature. At reference numeral 90 if the K+1 blocks including one MOS control block 62 and K valid POH data blocks 60 have been found, it is known that a valid MOS control block 62 is located in the search window and the location of the POH blocks is known. The state machine then returns to reference numeral 86 where the MOS control block and K POH data blocks are removed and the state machine again returns to reference numeral 88.

At reference numeral 92 if the MOS control block 62 is found but one or more POH blocks are missing or absence of a valid CRC indicates that K POH data blocks 60 are not valid, the positions of the K expected POH data blocks 60 is known because the position of the MOS control block 62 is known and the state machine returns to reference numeral 86 where the MOS control block 62 and the 64B/66B blocks in the expected positions of the K POH data blocks 60 are removed and the state machine again returns to reference numeral 88 where the data stream is searched at the next window location for the correct combination of K+1 blocks including one MOS control block 62 and K valid POH data blocks 60.

At reference numeral 94 if K POH data blocks 60 as validated by the CRC signature are found but no MOS control block 62 is found, the position in the window of the expected MOS control block 62 is still known and the state machine returns to reference numeral 86 where the K valid POH data blocks 60 and the 64B/66B block in the expected position of the MOS control block 62 are removed and the state machine again returns to reference numeral 88 where the data stream is searched at the next predetermined window location for the correct combination of K+1 blocks including one MOS control block 62 and K POH data blocks 60 having the valid CRC signature.

The POH blocks 60 may be found based on the fact that the position of the Kth POH data block 60 (containing the POH CRC field) relative to the MOS control block 62 is known (see, e.g., FIGS. 3A and 3B) and the fact that the MOS control block 62 is expected to be in one of the blocks in the window. Using the example of FIG. 3A, the Kth POH data block 60 containing the CRC field is known to be in the position immediately preceding the MOS control block 62. Tests are performed on candidate blocks in a range of positions, from the position immediately preceding the beginning of the window to the next-to last position in the window since this is the range of possible positions of the Kth POH data block 60.

For each candidate block, a CRC calculation is made for the data in the K contiguous block positions including as the last block the candidate block and this calculation is compared against data present in what would be the CRC position of the Kth block. The CRC calculation is repeated for each candidate block within the range. If one of the CRC comparisons is valid, the candidate block for which the comparison is valid is identified as the Kth POH block 60, meaning that the POH data blocks 60 have been found.

At reference numeral 96 if neither a MOS control block 62 nor K valid POH data blocks 60 are found, the state machine proceeds to reference numeral 98 where K+1 64B/66B blocks associated with at least one candidate MOS control block within the window are converted into Ethernet error blocks and an error flag is set. In embodiments of the invention, the number of K+1 64B/66B blocks that are converted into Ethernet error blocks may range from a single set of K+1 64B/66B blocks associated with a single candidate MOS control block to the sets of K+1 64B/66B blocks associated with every one of the candidate MOS control blocks (i.e., W sets of K+1 64B/66B blocks where the MOS window is W blocks wide).

After the K+1 64B/66B blocks associated with at least one candidate MOS control block 62 have been converted into Ethernet error blocks, the state machine proceeds to reference numeral 100 where K+1 blocks associated with a candidate MOS control block are extracted from the data stream. It does not matter which K+1 blocks are extracted from the data stream except that when K+1 64B/66B blocks associated with only a single candidate MOS control block 62 have been converted into Ethernet error blocks at reference numeral 98, the K+1 64B/66B blocks that are extracted at reference numeral 100 must be associated with a candidate MOS control block other than the ones that were converted to Ethernet error blocks to assure that at least one Ethernet error block remains in the data stream. FIG. 6 shows an illustrative non-limiting example of Ethernet error block conversion in this state of the state machine. Persons of ordinary skill in the art will appreciate that this is only an example and that schemes incorporating different window widths and numbers of POH data blocks 60 are contemplated. In the example of FIG. 6, the window is 5 blocks wide and K+1 is set equal to 3. Persons of ordinary skill in the art will appreciate that the number of POH blocks converted to Ethernet error blocks that are removed may extend beyond the width of the window. The state machine then again returns to reference numeral 84 where a new search is begun.

A simplified framer, illustrated in FIG. 8, searches only for the MOS control block 62 within this window in order to identify the location of the set of the MOS control block 62 and the POH data blocks 60. Here, the POH data block CRC only tells the receiver whether there is valid POH data that can be processed. Consequently, a corrupted MOS control block 62 can lead to the incorrect K+1 blocks being removed, and the potential associated corruption of a client packet. The solution of FIG. 8 presents a tradeoff between simplicity and a potential inability to resolve this error condition.

At reference numeral 112 an initial search is started. The initial search is depicted at reference numeral 114 in which the data stream is searched for an initial correct combination of one MOS control block 62 and K valid POH data blocks 60. After the combination of K+1 blocks including one MOS control block 62 and K valid POH data blocks 60 is found, i.e. K POH data blocks having a valid CRC signature within the window, at reference numeral 116 the K+1 blocks, i.e. the found one MOS control block 62 and K valid POH data blocks 60, are removed.

At reference numeral 118 the data stream is searched at the next expected POH window location for only the MOS control block 62. At reference numeral 120, the MOS control block 62 is found, it is known that MOS control block 62 and POH data blocks are located at known positions within the window and the state machine returns to reference numeral 116 where the K+1 blocks are removed. The POH data CRC signature can be used to determine whether the information in the K removed POH data blocks is error free, and thus K POH data blocks contain valid POH information. The state machine again returns to reference numeral 118 where the data stream is searched at the next POH window location for the MOS control block 62.

At reference numeral 122 if, no MOS control block 62 is found, the state machine proceeds to reference numeral 124 where K+1 64B/66B blocks associated with at least one of the candidate MOS control blocks within the window are converted into Ethernet error blocks and an error flag is set. As previously noted, in different embodiments of the invention these POH data blocks may or may not be entirely contained within the window. After the K+1 64B/66B blocks associated with at least one candidate MOS control block within the window are converted into Ethernet error blocks, the state machine proceeds to reference numeral 126 where K+1 blocks associated with a candidate MOS control block are extracted from the data stream. It does not matter which K+1 blocks are extracted from the data stream except that when K+1 64B/66B blocks associated with only a single candidate MOS control block 62 have been converted into Ethernet error blocks at reference numeral 124, the K+1 64B/66B blocks that are extracted at reference numeral 126 must be associated with a candidate MOS control block other than the ones that were converted to Ethernet error blocks to assure that at least one Ethernet error block remains in the data stream. Again, an illustrative arrangement for the extraction and Ethernet error block insertion is shown in FIG. 6. The state machine then again returns to reference numeral 114 where a new search of the data stream is begun for the one MOS control block 62.

The state machines of FIG. 7 and FIG. 8 may be configured from hardwired logic, or by a programmed logic circuit such as but not limited to a field programmable gate array (FPGA). In other embodiments of the invention, the state machines of FIG. 7 and FIG. 8 may be configured as software running on a processor or microcontroller.

The differences between the present invention and the prior art provide several advantages. Using POH data blocks 60 in combination with a special Ordered Set (MOS control block 62) provides a significant POH bandwidth efficiency improvement relative to the prior art that uses just Ordered sets. Placing the POH data blocks 60 immediately adjacent to the Ordered set (MOS control block 62) improves robustness over any solution that placed the POH data blocks 60 in other locations (e.g., separated further apart). In addition, placing the POH data blocks 60 immediately before the Ordered set (MOS control block 62) improves the ease of detecting them since no Idles can be inserted within the POH block set.

Including a CRC error check over the POH data blocks 60 creates a robust recognizable characteristic of this block set. This allows the potential for detecting the correct POH data block locations when the errors have corrupted the Ordered set (MOS control blocks 62), and hence provides an ability to avoid additional errors associated with either removing the wrong blocks or failing to remove the corrupted MOS control block 62 when reconstructing the original stream. It can also allow using the POH information from valid POH data blocks when transmission channel errors have corrupted POH information in the Ordered set (MOS control block 62).

Inserting the POH data blocks 60 on a regular basis at the transmitter guarantees deterministic POH latency and bandwidth. The recognizable nature of both the POH data blocks 60 and the MOS control blocks 62 makes it feasible to do this in a robust manner within the source and sink MTN Path shims. Inserting the POH data blocks 60 on a regular basis at the transmitter also enables the possibility for the source to send timing or delay measurement information to the sink.

Using the embodiment shown in FIG. 4A, FIG. 4B, and FIG. 4C, the set of "K" POH data blocks can carry 8*K−2 bytes of POH data rather than only the K bytes that could be carried by K MOS control blocks. Constants N and K (see FIGS. 2A, 2B, 3A, and 3B) are chosen by design. Specifically, the number of POH data blocks "K" is chosen based on tradeoffs between the bandwidth required to carry the necessary POH information, the required POH report latency, and the amount of associated bandwidth required to transmit the MOS control block and the K POH data blocks. Referring now to FIG. 9, a table shows examples of tradeoffs for POH bandwidth, latency, and PHY rate increase in choosing N and K. Column 1 of FIG. 9 shows different potential values of N, column 2 shows the resulting minimum window W. The other values in FIG. 9 are all based on a nominal transmission rate of 5 Gbit/s for the Path signal frame. The frame period in FIG. 9 refers to the time between appearances of POH blocks (i.e., the time required to transmit the Path signal frame of FIG. 2). The raw POH bandwidth in columns 5 and 7 is the bandwidth provided for carrying POH information by the combination of the bits between the 0x4B and the O code of the MOS (FIG. 4A) and the value fields of the POH data blocks 60 (FIGS. 4B and 4C). The additional transmission bandwidth in columns 4 and 6 represents the amount of additional bandwidth required to transmit all the bits of the MOS control block 62 and K POH data blocks 60 along with the N payload blocks 64 relative to the bandwidth required to just transmit the N payload blocks 64 in that frame period. The increase is expressed in parts per million (ppm) relative to the Path signal transmission rate.

While the simplest and preferred method to accommodate the POH bandwidth is to increase the PHY rate by the rate associated with the added POH block set, alternatively, if adequate POH performance can be achieved with a sufficiently large N and small K, it may be possible to create the required POH bandwidth by Ethernet Idle removal at the source node rather than increasing the PHY rate. As shown in FIG. 9, this rate increase can be kept small.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for extracting path overhead (POH) data blocks and a Metro Transport Network ordered set (MOS) control block from a data stream in a 64B/66B-block communication link, the method comprising:
   1) receiving at a sink node a data stream in a 64B/66B-block communication link;
   2) finding within the data stream a first combination of an initial MOS control block and initial K valid POH data blocks including CRC data;
   3) extracting the initial MOS control block and the K initial valid POH data blocks including the CRC data from the data stream;
   4) searching within a predetermined window in the data stream for a subsequent MOS control block; and
   5) if the subsequent MOS control block is found within the predetermined window, removing the found subsequent MOS control block and K POH data blocks associated with the subsequent MOS control block from the data stream and returning to 4).

2. The method of claim 1 further comprising:
   if the subsequent MOS control block is not found within the predetermined window, converting K+1 64B/66B blocks associated with at least one candidate MOS control block to Ethernet error blocks, extracting from the data stream K+1 64B/66B blocks associated with a candidate MOS control block such that at least one Ethernet error block remains in the data stream and returning to 2).

3. The method of claim 2 further comprising:
   after converting K+1 64B/66B blocks associated with at least one candidate subsequent MOS control block to Ethernet error blocks, setting an error flag before returning to 2).

4. The method of claim 1 wherein:
   searching within a predetermined window in the data stream for a subsequent MOS control block comprises searching for the subsequent MOS control block within the window and K valid POH data blocks associated with the subsequent MOS control block; and
   if the subsequent MOS control block and subsequent K valid POH data blocks are found, removing the found subsequent MOS control block and the K valid POH data blocks from the data stream and returning to 4);
   if the subsequent MOS control block is found, but the subsequent K valid POH data blocks associated with the subsequent MOS control block are not found, removing the subsequent MOS control block and removing 64B/66B-blocks in expected positions of the subsequent K POH data blocks from the data stream and returning to 4);
   if the subsequent MOS control block is not found within the predetermined window and the subsequent K valid POH data blocks are found, removing the subsequent K valid POH data blocks from the data stream and a 64B/66B block from the expected location of the subsequent MOS control block and returning to 4); and
   if neither the subsequent MOS control block nor subsequent K POH data blocks are found within the predetermined window, converting K+1 64B/66B blocks associated with at least one candidate subsequent MOS control block to Ethernet error blocks, extracting from the data stream K+1 64B/66B blocks associated with a candidate subsequent MOS control block such that at least one Ethernet error block remains in the data stream and returning to 4).

5. The method of claim 4 further comprising:
after converting K+1 64B/66B blocks associated with at least one candidate subsequent MOS control block to Ethernet error blocks, setting an error flag before returning to 4).

6. A method for inserting path overhead (POH) data blocks and a Metro Transport Network ordered set (MOS) control block into a data stream in a source node of a 64B/66B-block communication link, the method comprising:
generating a MOS control block by assembling MOS control data into a 64B/66B block;
generating K POH data blocks by assembling POH data into K 64B/66B blocks; and
inserting the MOS control block and the K POH data blocks into the data stream adjacent to one another in the 64B/66B-block communication link, the MOS control block following the K POH data blocks.

7. The method of claim 6 further comprising inserting or deleting idle blocks in the data stream to maintain a data rate in the source node.

8. The method of claim 6 further comprising inserting or deleting idle blocks in the data stream to match a data rate of the data stream in the source node to a data rate of a section layer connecting the source node to an intermediate node in the 64B/66B-block communication link.

9. A method for inserting path overhead (POH) data blocks and a Metro Transport Network ordered set (MOS) control block into a data stream in a source node of a 64B/66B-block communication link, the method comprising:
generating the MOS control block by assembling MOS control data into a 64B/66B block;
generating K POH data blocks by assembling POH data into K 64B/66B blocks; and
inserting the MOS control block and the K POH data blocks into the data stream by inserting K−1 POH data blocks into the data stream adjacent to one another, inserting the MOS control block following the K−1 POH blocks and inserting a Kth POH data block following the MOS control block.

10. The method of claim 9 further comprising inserting or deleting idle blocks in the data stream to maintain a data rate in the source node.

11. The method of claim 9 further comprising inserting or deleting idle blocks in the data stream to match a data rate of the data stream in the source node to a data rate of a section layer connecting the source node to an intermediate node in the 64B/66B-block communication link.

12. A source node for providing path signal overhead in a 64b/66b character stream of an ITU-T metro transport network, the source node comprising:
a circuit for receiving a 64B/66b character stream and periodically inserting a Metro Transport Network ordered set (MOS) control block and K path overhead (POH) data blocks into the 64B/66b character stream to form a transmit path signal frame, wherein the K POH data blocks are inserted adjacent to one another and the MOS control block is inserted following the K POH blocks;
a circuit for inserting/removing 64B/66B idle blocks to adapt the rate of the character stream to a FlexE calendar slot rate;
a circuit for mapping the character stream FlexE calendar slots; and
a circuit for inserting section layer overhead (SOH) into the character stream.

13. A sink node for extracting path signal overhead in a 64b/66b character stream of an ITU-T metro transport network, the sink node comprising:
a circuit for removing section layer overhead (SOH) from the character stream;
a circuit for extracting the character stream from received calendar slots;
a circuit for rate adapting the character stream by inserting/removing idle blocks from the character stream in accordance with ITU-T metro transport network protocol; and
a circuit for extracting Metro Transport Network ordered set (MOS) control blocks and path overhead (POH) data blocks from the 64B/66b character stream and configured to search the character stream to find sets of 64B/66b blocks each including a MOS control block and at least one POH data block, and remove found sets of 64B/66b blocks including a MOS control block and at least one POH data block from the character stream.

14. The sink node of claim 13 wherein the circuit for extracting MOS control blocks and POH data blocks from the 64B/66b character stream is further configured to:
extract the MOS control block and a number of 64B/66b blocks equal to the at least one POH data block from expected locations in the 64B/66b character stream when the MOS control block is found and the at least one POH data block cannot be found;
extract the at least one POH data block and a 64B/66B data block from an expected MOS control block location in the 64B/66b character stream when the at least one POH data block is found and the MOS control block cannot be found; and
extract a number of 64B/66b blocks equal to the total number of blocks in a set of MOS control blocks and POH data blocks from expected locations in the 64B/66b character stream when the set of MOS control blocks and POH data blocks cannot be found.

15. A source node for providing path signal overhead in a 64b/66b character stream of an ITU-T metro transport network, the source node comprising:
a circuit for receiving a 64B/66b character stream and periodically inserting a Metro Transport Network ordered set (MOS) control block and K path overhead (POH) data blocks into the 64B/66b character stream to form a transmit path signal frame, wherein K−1 POH data blocks are inserted adjacent to one another, the MOS control block is inserted following the K−1 POH blocks and a Kth POH data block is inserted following the MOS control block;
a circuit for inserting/removing 64B/66B idle blocks to adapt the rate of the character stream to a FlexE calendar slot rate;
a circuit for mapping the character stream FlexE calendar slots; and
a circuit for inserting section layer overhead (SOH) into the character stream.

* * * * *